July 29, 1941.  I. W. EDWARDS  2,250,907

COMPOSITE ELECTRIC CABLE

Filed March 26, 1938

Inventor:
IRVING W. EDWARDS,
by: John E. Jackson
His Attorneys.

Patented July 29, 1941

2,250,907

UNITED STATES PATENT OFFICE 2,250,907

COMPOSITE ELECTRIC CABLE

Irving W. Edwards, Detroit, Mich.

Application March 26, 1938, Serial No. 198,313

4 Claims. (Cl. 174—128)

This invention is particularly concerned with composite electric cables, one of the objects being to make a three-wire cable of balanced construction embodying different metals, respectively chosen for their physical and electrical characteristics and combined in such a manner that the cable permanently maintains its proper configuration even after being tensioned beyond the elastic limit of the metal used because of its electrical conductivity advantages and which is therefore necessarily of relatively low elastic limit.

Generally speaking, a composite electric cable embodying the principles of the invention comprises a shaped wire providing longitudinally extending, diametrically opposed valleys, this wire being made of metal having good electrical conductivity and being formed so that its valleys are helical, other wires having higher elastic limits and greater tensile strength being helically laid in these valleys and preformed or post-formed so as to recoil upon a decrease in the tensioning of the cable and so stay in position. Such a construction may be broadly considered as a strand of wires; so, although the invention is primarily concerned with electric cables, its scope need not necessarily be confined to such.

Specific examples of the invention are illustrated by the accompanying drawing, in which.

In the case of the first example, the shaped wire 1 providing the longitudinally extending valleys 2, and which is twisted, drawn or rolled so that these valleys are spiral or helical, is made of copper or other metal of good electrical conductivity but having a relatively low elastic limit which is very apt to be exceeded in the case of long cable span tensions. The wires 3, which are helically laid in the valleys 2, are made of steel or other metal of relatively high elastic limit and are preformed or post-formed and thus permanently hold the structure in position. That is to say, when the strand assembly is used under sufficient tension to cause its elongation the steel or other metal wires of relatively high elastic limit function upon a decrease of the tension on the strand, by recoiling so as to return the wire of lower elastic limit to its normal position even though the last named wire may have been stressed beyond its elastic limit by tensioning of the strand.

Figure 2:
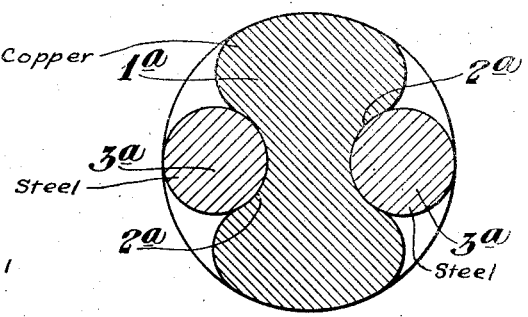
Figure 2 is a cross-section of a second example.

The second example, shown by Figure 2, embodies the same elements as does the first example, these being therefore similarly numeraled and identified by the letter $a$. The difference in this second example is that the wire $1^a$ is made with a larger cross-section, while the valleys $2^a$ are made relatively deep, the wires $3^a$ being the same as the wires 3 of the first example. Thus, the result is a cable having greater electrical conductivity with an overall diameter the same as that of the first example.

Figure 3:
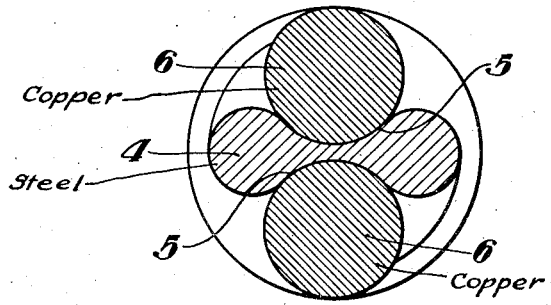
Figure 3 is a cross-section of a third example.

Figure 3 shows a shaped wire 4 of relatively small cross-sectional area having the valleys 5 previously described, wires 6 being helically laid in these valleys. In this case the wire 4 is made of metal having the higher elastic limit and is formed with helical valleys 5, the wires 6 being those included primarily as electric conductors, and, therefore, made of copper or other more conductive or relatively softer metal laid in or formed therein by preforming or post-forming. When this cable is tensioned beyond the elastic limit of the wires 6, the latter are retained upon release of this tension by reason of the twisted form of the wire 4 and wires 6.

In all cases the valleys are formed diametrically opposite, while the wires providing these valleys are of a generally symmetrical shape respecting their axes. Since the wires laid in these valleys are of similar size and diameter, it follows that the cables are symmetrically balanced, although including only three wires, and that the various wires are permanently retained in their proper positions respecting the cable as a whole.

Figure 1:
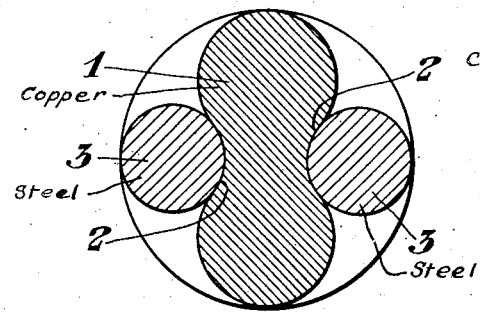
Figure 1 is a cross-section of a first example.

Figures 1 and 2 show constructions that are essentially circular and have the advantage of being able to minimize vibrational stresses and fatigue from wind forces in a more or less axial direction, whereas the cable in Figure 3, being less circular and possessing deeper interstices between the wires, will be more effected by axial vibration but possibly less by lateral wind forces than the other examples.

The construction of the strands in this invention provide large bearing surfaces between the respective wires which have the advantage of minimizing the tendency toward removal of the galvanized coatings on the wires due to the abrasive action of one wire upon another under coiling or vibrational conditions.

A further feature of the invention consists in making or processing the various wires so that they all have physical characteristics providing the same percentages of elongation regardless of their differences respecting elastic limits and tensile strengths. An exemplary way of accomplishing this is by giving a lesser number of cold drawing drafts to the hard drawn copper wire used, whereby to bring its elongation to about the same as steel wire cold drawn to provide it with a permanent elongation under tensile stress of about 4½ per cent. The ordinary hard drawn copper wire commercially available has an elongation of only about 1½ per cent.

I claim:

1. A flexible strand of wires adapted to be used under sufficient tension to cause its elongation and comprising a solid wire with its surface providing two diametric helical valleys, and helical wires laid in said valleys and radially supported by said solid wire, said two helical wires being made of metal having similar physical characteristics and said solid wire being made of metal having physical characteristics differing from those of the metal from which said two helical wires are made, one of said metals having a higher elastic limit than the other of said metals, the portion of said strand made of said metal of higher elastic limit being formed so as to recoil upon a decrease in tension on said strand and return the other portion of said strand to its normal position even though the other portion may have been stressed beyond its elastic limit by tension of said strand.

2. A flexible strand of wires adapted to be used under sufficient tension to cause its elongation and comprising a solid wire with its surface providing two diametric helical valleys, and helical wires laid in said valleys and radially supported by said solid wire, said two helical wires being made of metal having similar physical characteristics and said solid wire being made of metal having physical characteristics differing from those of the metal from which said two helical wires are made, one of said metals being copper and the other of said metals being steel, the portion of said strand made of the steel being formed so as to recoil upon a decrease in tension on said strand and return the portion made of copper to its normal position even though the copper portion may have been stressed beyond its elastic limit by tensioning of said strand.

3. A flexible strand of wires adapted to be used under sufficient tension to cause its elongation and comprising a solid wire with its surface providing two diametric helical valleys, and helical wires laid in said valleys and radially supported by said solid wire, said two helical wires being made of metal having similar physical characteristics and said solid wire being made of metal having physical characteristics differing from those of the metal from which said two helical wires are made, one of said metals being copper and the other of said metals being steel, the portion of said strand made of the copper being processed to provide it with the same degree of permanent elongation under stress as the portion made of the steel.

4. A composite electric cable comprising a shaped wire providing longitudinally extending, diametrically opposite valleys, said wire being formed so said valleys are helical respecting the axis of said wire, and wires laid in said valleys, the second named wires being made of metal having similar physical and electrical characteristics and said shaped wire being made of metal having physical and electrical characteristics differing from those of the metal from which said second named wires are made, one of said metals having a lower elastic limit but better electrical conductivity than the other and the portion of said cable made of the metal having a higher elastic limit being formed so as to recoil upon a decrease in tension on said cable and return the other portion of said cable to its normal position even though the other portion may have been stressed beyond its elastic limit by tensioning of said cable.

IRVING W. EDWARDS.